United States Patent [19]
Crivello et al.

[11] Patent Number: 5,272,233
[45] Date of Patent: Dec. 21, 1993

[54] PLATINUM-BASED CATALYSTS FOR THE POLYMERIZATION OF VINYL ETHER MONOMERS AND POLYMERS

[75] Inventors: James V. Crivello, Clifton Park; Mingxin Fan, Troy, both of N.Y.

[73] Assignee: General Electric Company, Waterford, N.Y.

[21] Appl. No.: 916,283

[22] Filed: Jul. 17, 1992

[51] Int. Cl.$^5$ .................. C08F 130/08; C08F 116/12; C08F 4/80

[52] U.S. Cl. .................. 526/279; 526/126; 526/332; 526/333; 526/334; 528/15; 528/25; 528/31; 528/32

[58] Field of Search .............. 526/126, 279, 332, 333, 526/334; 525/245, 254, 342; 528/15, 25, 31, 32

[56] References Cited

U.S. PATENT DOCUMENTS 4,764,577  8/1988  Inoue et al. .......................... 525/409
5,145,915  9/1992  Weitemeyer et al. ............. 525/403

OTHER PUBLICATIONS

Speier, J. L., "Homogeneous Catalysis of Hydrosilation By Transition Metals", *Advances in Organometallic Chemistry*, vol. 17, pp. 407-447 (1979).

Aylett, *Organometallic Compounds*, vol. 1, p. 107, John Wiley, New York (1979).

Crivello, J. V. et al., "The Synthesis, Characterization, and Photoinitiated Cationic Polymerization of Silicon-Containing Epoxy Resins", *J. Polymer Sci.*, vol. 28, pp. 479-503, John Wiley, New York (1990).

Schildknecht, C. E., *Vinyl Related Polymers*, p. 593, John Wiley and Sons, (1952).

Crivello, J. V., *Adv. in Polymer Science*, 62, p. 1, (1984).

*Primary Examiner*—Joseph L. Schofer
*Assistant Examiner*—Mark Nagumo

[57] ABSTRACT

The present invention relates to a curable polyvinyl ether composition created using a novel catalyst system for the synthesis of polyethers from vinyl ether monomers or polymers. This catalyst system comprises a platinum complex catalyst and silicon hydride cocatalyst. The invention also relates to a method of producing polyethers from vinyl ether monomers or polymers using the above-mentioned catalyst system.

11 Claims, No Drawings

PLATINUM-BASED CATALYSTS FOR THE POLYMERIZATION OF VINYL ETHER MONOMERS AND POLYMERS

CROSS REFERENCE TO RELATED APPLICATIONS

This application is related to previously filed pending application Nos. 07/934,584, pending 07/896,935, pending 07/896,950, pending, and 07/904,350, now allowed the entire disclosures of which are incorporated herein by reference.

BACKGROUND OF THE INVENTION

1. Field of the Invention

The present invention relates to a curable polyvinyl ether composition created by using a novel catalyst system for the synthesis of polyethers from vinyl ether monomers or polymers. This catalyst system comprises a platinum complex catalyst and silicon hydride cocatalyst. The invention also relates to a method of producing polyethers from vinyl ether monomers or polymers using the above-mentioned catalyst system.

2. Technology Review

Platinum catalysts have long been known to promote the hydrosilation reaction. These platinum catalysts have been used in the production of epoxysilicone compositions and vinylsilicone compositions. See, for example, J. L. Speier, "Homogeneous Catalysis of Hydrosilation by Transition Metals", in *Advances in Organometallic Chemistry*, Vol. 17, pp. 407–447 (1979), F. G. A. Stone and R. West, eds., Academic Press (New York, San Francisco, London); Aylett, *Organometallic Compounds*, Vol.1, John Wiley, New York 1979, p. 107; and Crivello and Lee, "The Synthesis, Characterization, and Photoinitiated Cationic Polymerization of Silicon-Containing Epoxy Resins", *J. Polymer Sci.*, Vol. 28, John Wiley, New York 1990, pp. 479–503. Generally, the hydrosilation catalysts used are complexes of platinum, palladium, rhodium, iridium, iron or cobalt. In particular, platinum-containing catalysts have been widely used for this purpose.

Platinum containing catalysts, such as the Ashby, Karstedt, Speier and Lamoreaux catalysts have been found highly useful as catalysts employed in the hydrosilation reaction, i.e. the addition of Si—H containing compounds to olefinic and acetylenic bonds (B. J. Aylett, *Organometallic Compounds*, Vol 1, John Wiley, New York, 1979, p. 107; J. L. Speier, Adv. in *Org. Chem.*, Vol. 17, 407, 1974). This chemistry is extensively practiced at the General Electric Silicone Products Division for the synthesis of silicone intermediates and in the production of heat cured elastomers and coatings.

These platinum catalysts, however, until now have not been employed in the polymerization of vinyl ether monomers or polymers. Traditionally, vinyl ether monomers and polymers were polymerized under cationic polymerization conditions (C. E. Schildknecht, *Vinyl and Related Polymers*, John Wiley and Sons, 1952, p.593.). In our own work, we have employed onium salts for the thermal and photochemical cationic polymerization of vinyl ether monomers (J. V. Crivello, *Adv. in Polym. Sci.*, 62, 1 1984). At the same time, vinyl ethers undergo free radical homopolymerization very sluggishly but copolymerize vigorously with monomers having electron deficient double bonds. There is, however, no mention in the literature of the polymerization of vinyl ether containing monomers and polymers in the presence of platinum containing catalysts.

The disadvantages of the traditional catalysts are that they tend to be required in larger quantities, to induce color and oxidative instability in the final cured resin, or corrode metals in contact with the resin. The present inventions use of platinum catalysts to promote vinyl ether polymerization provides numerous advantages over catalysts presently used to catalyze such polymerization. These advantages include the use of low levels of catalyst and the low tendency of catalyst residues to induce color and oxidative instability in the final cured resin, or corrosion of metals in contact with the resin. The novel polymerization catalysts tend to have excellent solubility in silicon-containing vinyl ether monomers, whereas other initiators, eg. onium salts, have very poor solubility.

SUMMARY OF THE INVENTION

The present invention provides a curable polyether composition comprising:

(A) from about 0.5 to about 100 parts by weight of the mixture of a compound containing a

radical;

(B) from about 0.5 to about 10,000 ppm by weight of the mixture of a platinum catalyst in the form of a platinum-metal complex; and (C) from about 1 to about 20,000 ppm of hydrogen by weight of the mixture in the form of silicon hydride co-catalyst;

The present invention also provides a method of producing polyethers from vinyl ether monomers or polymers using a novel catalyst system.

DETAILED DESCRIPTION OF THE INVENTION

The present invention is based on a novel platinum containing catalyst system for the polymerization of vinyl ethers. This novel catalyst system is a combination of a platinum catalyst which herein is also referred to as Component (B) with a SiH cocatalyst which herein is referred to as Component (C). When combined with vinyl ether monomers or polymers, the vinyl ethers undergo a reaction illustrated by the following general equation,

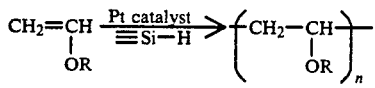

where R is a 1 to about 20 alkyl carbon chain radical, and n is from about 5 to about 100,000, preferably from about 5 to about 50,000, and most preferably from about to about 10,000.

The present invention provides a curable polyether composition comprising:

(A) from about 0.5 to about 100 parts by weight of the mixture of a compound containing a

radical;

(B) from about 0.5 to about 10,000 ppm by weight of the mixture of a platinum catalyst in the form of a platinum-metal complex; and course of this invention are given in the formulas shown below (see J. V. Crivello, U.S. Pat. No. 4,705,887, Nov. 10, 1987).

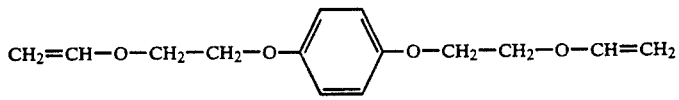

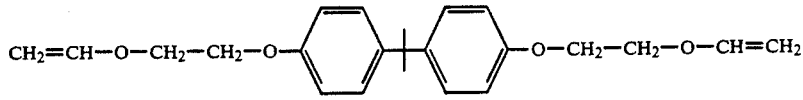

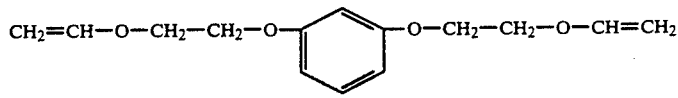

(C) from about 1.0 to about 20,000 ppm of hydrogen by weight of the mixture in the form of silicon hydride co-catalyst;

Of particular interest are vinyl ether monomers containing silicon. For example, the siloxane modified monomers and polymers depicted below.

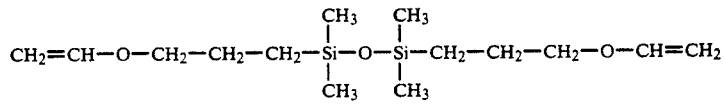

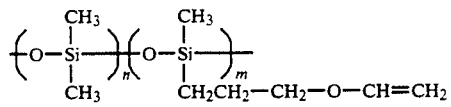

The present invention also provides a method of producing polyethers from vinyl ether monomers or polymers using a novel catalyst system and comprising the steps of:

(i) preparing a mixture comprising the following components:

(A) from about 0.5 to about 100 parts by weight of the mixture of a compound containing at least one $$H_2C=Ch-O-$$

radical;

(B) from about 0.5 to about 10,000 ppm by weight of the mixture of a platinum catalyst in the form of a platinum-metal complex; and (C) from about 1.0 to about 20,000 ppm of hydrogen by weight of the mixture in the form of silicon hydride co-catalyst;

(ii) reacting the mixture of said step (i) at a temperature of from about 25° C. to about 150° C. to produce a polyether.

The monomers and polymers containing vinyl ether functional groups which can be polymerized using the novel catalyst system. Component (A) is a vinyl ether or compound containing at least one $$H_2C=Ch-O-$$

radical;

Examples of compounds which can be used for Component (A) are 1,2-ethylene glycol divinyl ether, 1,3-propanediol divinyl ether, 1,4-butanediol divinyl ether, triethyleneglycol divinyl ether, 1,4-cyclohexanedimethanol divinyl ether, ethyl vinyl ether, n-butyl vinyl ether, lauryl vinyl ether, 2-chloroethyl vinyl ether. Other examples of vinyl ethers which can be used in the The number of vinyl ether radicals per molecule of Component (A) is preferably from about 1 to about 1000, and most preferably from about 1 to about 100.

The preferred compound for Component (A) is

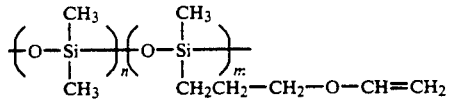

Component (A) is used in the method and composition of the present invention in an amount ranging from about 0.5 to about 100 parts by weight of the composition, preferably from about 1 to about 90 parts by weight of the composition, and most preferably from about to about 70 parts by weight of the composition, based upon the weight of the composition consisting of Components (A), (B) and (C).

Component (B) is a platinum catalyst. The platinum catalyst used for Component (B) in the polymerization can be any one of several hydrosilation catalysts including for example the well known Ashby, Karstedt, Lamoreaux, or Speier catalysts. In addition, it has been found that a wide variety of other platinum-containing compounds may also function as vinyl ether polymerization catalysts including for example; $PtCl_2(COD)$, $PtCl_2(benzonitrile)_2$ and $H_2PtBr_6$. Only very low levels of the platinum initiator is necessary for successful polymerization.

The use of platinum catalysts to promote vinyl ether polymerization provides numerous advantages over catalysts presently used to catalyze such polymerization. These advantages include the use of low levels of catalyst and the low tendency of catalyst residues to induce color and oxidative instability in the final cured resin, or corrosion of metals in contact with the resin. The novel polymerization catalysts tend to have excellent solubility in silicon-containing vinyl ether monomers, whereas other initiators, eg. onium salts, have very poor solubility.

In the method and composition of the present invention the catalysts (B) are most useful and economical in the range from about 0.5 to about 10,000 ppm by weight of the composition, preferably from about 0.5 to about 1000 ppm by weight of the composition, and most preferably from about 5 to about 100 ppm by weight of the composition, based upon the weight of the composition consisting of Components (A), (B) and (C).

Component (C) is a cocatalyst consisting of a compound containing SiH bonds. Component (C) is required for successful initiation of the polymerization of Component (A). Essentially any compound or polymer containing SiH functional groups is effective as a cocatalyst. Component (C) is an organohydrogensiloxane or organohydrogensilane. Suitable silicon hydride-containing starting materials generally include any silicon compound derived from a silane or organosiloxane units having terminal or pendant SiH groups. The SiH-containing silicones useful in the practice of the invention are those capable of reacting with the ethylenically unsaturated moieties of the vinyl ethers of Component (A) above via the hydrosilation addition reaction.

Examples of Component (C) may be either a linear hydrogen substituted polysiloxane or silane or a cyclic hydrogen substituted polysiloxane or silane, or a combination of the two. The linear hydrogen substituted polysiloxane or silane may be either branched or unbranched. In addition, Component (C) organohydrogensiloxanes useful in the invention may be copolymers, terpolymers, etc. Representative examples of suitable linear SiH-containing compounds include 1,1,3,3-tetraalkyldisiloxane, dialkylhydrogensiloxy-endstopped polydialkylsiloxane. Other examples of SiH-containing compounds useful in the invention include 1,1,3,3-tetramethyldisiloxane, 2,4,6,8-tetramethyl-cyclotetrasiloxane, methyldimethoxysilane, triethoxysiolane, triethylsilane, poly(methylhydrogensiloxane), n-butylsilane, phenylsilane, 1,2-dimethyldisilane, diethylsilane and methyldiethoxysilane. Other examples include compounds of the formulae:

$$H-\underset{\underset{CH_3}{|}}{\overset{\overset{CH_3}{|}}{Si}}-O-\underset{\underset{CH_3}{|}}{\overset{\overset{CH_3}{|}}{Si}}-H$$

$$H-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-H$$

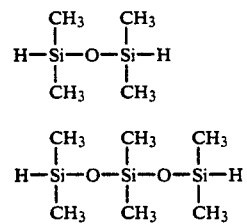

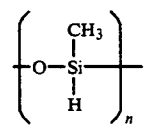

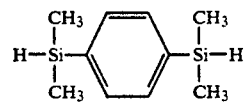

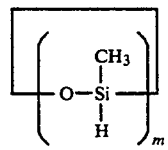

where m and n are integers and n is from about 4 to about 5000 and m is from about 3 to about 20.

The preferred linear SiH-containing silicon compound for Component (C) in the present invention is 1,1,3,3-tetramethyldisiloxane. The preferable cyclic hydride polysiloxane is 2,4,6,8-tetramethylcyclotetrasiloxane.

The preferred Component (C) in the present invention is the aforementioned 1,1,3,3-tetramethyldisiloxane.

In the method and composition of the present invention the catalysts (C) are most useful in the range of from about 1.0 to about 20,000 ppm by weight of the composition of the SiH portion of the SiH containing compounds, preferably from about 1.0 to about 500 ppm by weight of the composition, and most preferably from about 5 to about 100 parts per million of the weight of the composition, based upon the weight of the composition consisting of Components (A), (B) and (C).

The composition and method of the present invention are useful in numerous applications. Two component curing systems may be designed in which the vinyl ether is first mixed with a catalytic amount of an active platinum compound. Then, on addition of the Si-H functional silicon compound, cure takes place. Such two component cure systems are useful in elastomers, including RTVs in adhesives, in composites such as circuit boards, filament wound structures, pultrusions, particularly, in reaction injection molding (RIM) and liquid injection molding (LIM), in compression, transfer and injection molding compounds, and in electrical and electronic encapsulations.

Therefore in practice, the method of making the curable composition of the present invention, includes bringing Components (A), (B) and (C) together in a reaction vessel of suitable size for the size of the batch. Addition of the Components is preferably with mixing. A volatile solvent, preferably toluene, xylene or hexane, may also be added to the reaction mixture in order to facilitate the mixing process and dispersion of the Components.

The curable polyvinyl ether composition of the invention is then prepared by reacting the mixture of Components (A), (B) and (C) at a temperature in the range of from about 25° C. to about 200° C., preferably from about 25° C. to about 150° C. and most preferably from about 40° C. to about 100° C. The temperature of the reaction mixture is then maintained until the completion of the addition reaction, which can be conveniently determined through IR spectroscopy by the disappearance of the strong absorbance at 2200 cm$^{-1}$ due to the SiH group.

A preferred curable composition of the present invention comprises a vinyl ether functional polydimethylsiloxane.

In one embodiment of the invention, the present composition is readily prepared by mixing Components (A), (B), and (C) either in a reaction vessel or otherwise. In another embodiment of the invention, any two of Components (A), (B) or (C), as defined above, can be premixed, and the third Component then added later to produce the composition of the invention by the present method. Such mixtures in this embodiment exemplify the fact that the Components of the invention may be pre-mixed so as to provide what is in practicing the invention essentially a two-component system for making a curable polyvinyl ether.

Additional control of the reactivity of the cure chemistry can be achieved through the use of selective inhibitors and retarders for the platinum initiators. With the use of these agents, various levels of latency can be obtained. For example, one can employ fugitive inhibitors such as low molecular weight alcohols, phosphines, nitriles and ene-ynes which block the initiator activity but can be volatilized on heating. Once these inhibitors are lost, initiator activity is restored and polymerization takes place. By careful selection of the boiling points of the inhibitors, it should be possible to exercise considerable control over the temperature of the onset of the polymerization.

In order that persons skilled in the art may better understand the practice of the present invention, the following examples are provided by way of illustration, and not by way of limitation. Additional information which may be useful in state-of-the-art practice may be found in each of the references and patents cited herein, which are hereby incorporated by reference.

EXAMPLES

Example 1

To 2.5 g of 1,6-hexanediol divinyl ether there were added 0.25 g (10%) of 2,4,6,8-tetramethylcyclotetrasiloxane ($d_4^H$) and the mixture stirred to dissolve the two components. Next, one drop of chloroplatinic acid in ethanol (Speier's catalyst) was added and dispersed in the first two components. The reaction mixture was allowed to stand at room temperature. A rapid exothermic polymerization was noted after 5 minutes which resulted in a cured crosslinked solid polymer suitable for an encapsulating or potting resin.

Example 2

A 2.0 g sample of triethyleneglycol divinyl ether was mixed with 1.0 g poly(methylhydrogen siloxane) fluid. Then 4 drops of the Ashby catalyst which containing 1.75% platinum metal were added. Within two minutes at room temperature, the reaction mixture became cloudy as temperature rose and the polymerization proceeded. Within 2 minutes, the reaction mixture solidified. The reaction product was a crosslinked network polymer. The above example demonstrates the use of a polymer containing pendant Si—H groups as a cocatalyst.

Example 3

Example 2 was repeated this time using 2.0 g triethyleneglycol divinyl ether, 4 drops of the Ashby catalyst and 0.5 g poly(methylhydrogen siloxane) oligomer. In this case, the reaction mixture required 5 minutes to solidify to a crosslinked polymer.

Example 4

The above polymerization was repeated using 2.0 g triethyleneglycol divinyl ether, 4 drops of the Ashby catalyst and 5 drops of diphenyl silane. The reaction mixture became viscous as the polymerization proceeded. The above example shows the use of a multifunctional Si—H compound as a cocatalyst for the polymerization of a divinyl ether monomer.

Example 5

Example 2 was once again repeated using 2.0 g triethyleneglycol divinyl ether, 4 drops of the Ashby catalyst and 4 drops of n-butylsilane. Again, on standing at room temperature, the reaction mixture became very viscous as reaction proceeded.

Example 6

To 2.0 g of 1,4-cyclohexanedimethanol divinyl ether there were added 1.0 g poly(methylhydrogen siloxane) and 4 drops of the Ashby catalyst. An exothermic polymerization took place on mixing which resulted after ten minutes standing in a crosslinked solid polymer. This example demonstrates the use of a different multifunctional vinyl ether as a substrate for the polymerization.

Example 7

Example 6 was repeated using 0.5 g of poly(methylhydrogen siloxane) as a cocatalyst. Exothermic polymerization took place resulting in a hard solid polymer after 2 minutes.

Example 8

Example 6 was repeated replacing the poly(methylhydrogen siloxane) with 5 drops of n-butylsilane. On standing at room temperature, polymerization resulted in a viscous polymeric product.

It is understood that various other modifications will be apparent to and can be readily; made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A curable polyether composition comprising:
   (a) from about 0.5 to about 100 parts by weight of the composition consisting of components (A), (B) and (C), of the mixture of a vinyl ether compound containing at least one

$H_2C\!=\!CH\!-\!O\!-$ radical;
   (B) from about 0.5 to about 10,000 ppm by weight of the composition consisting of components (A), (B) and (C), of the mixture of a platinum catalyst in the form of a platinum-metal complex; and
   (C) a silicon hydride co-catalyst in an amount of from about 1.0 to about 20,000 ppm by weight of the composition consisting of components (A), (B) and (C).

2. The composition as set forth in claim 1, wherein in (A) said compound is a divinyl ether.

3. The composition as set forth in claim 2, wherein in (A) said divinyl ether is selected from the group consisting of 1,2-ethylene glycol divinyl ether; 1,3-propanediol divinyul ether; 1,4-butanediol divinyl ether; triethyleneglycol divinyl ether; and 1,4-cyclohexanedimethanol divinyl ether.

4. The composition as set forth in claim 1, wherein in (A) said compound is a divinylethersiloxane.

5. The composition a set forth in claim 1, wherein in (A) said vinyl ether compound is 1,2-tetramethyl-1,2-(3-vinyletherpropyl)disiloxane or poly(methylvinylether)siloxane.

6. The composition as set forth in claim 1, wherein in (B) said platinum-metal complex is selected from the group consisting of: Ashby catalyst, Karstedt catalyst, Lamoreaux catalyst, Speier catalyst, $PtCl_2(COD)$, $PtCl_2(benzonitrile)_2$ and $H_2PtBr_6$.

7. The composition as set forth in claim 1, wherein in (C) said silicon hydride is a organohydrogensilane.

8. The composition as set forth in claim 7, wherein in (C) said organohydrogensilane is selected from the group consisting of diethylsilane; n-hexylsilane; n-butylsilane; methyldimethoxysilane; triethylsilane, phenylsilane; triethoxysilane; and 1,2-dimethyldisilane.

9. The composition as set forth in claim 1, wherein in (C) said silicon hydride is an organohydrogensiloxane.

10. The composition as set forth in claim 9, wherein in (C) said organohydrogensiloxane is selected from the group consisting of 1,1,3,3-tetramethyldisiloxane; 2,4,6,8-tetramethylcyclotetrasiloxane; poly(methylhydrogen)siloxane.

11. A method of producing polyethers from vinyl ether monomers or polymers comprising the steps of:
(i) preparing a mixture of the curable composition contained in claim 1;
ii the mixture of said step (i) at a temperature of from about 25° C. to about 150° C. to produce a polyether.

* * * * *